US012782917B2

(12) United States Patent
Honegger et al.

(10) Patent No.: US 12,782,917 B2
(45) Date of Patent: Nov. 3, 2026

(54) SYSTEM FOR ACCESS AND ORGANIZATION OF DATA FROM COMPUTER NUMERICAL CONTROL MACHINE TOOLS

(71) Applicant: UNITED MACHINING NORTH AMERICA LLC, Lincolnshire, IL (US)

(72) Inventors: Andrew Honegger, Glenview, IL (US); Andrew Phillip, Marietta, GA (US); Onik Bhattacharyya, Batavia, IL (US); David Beiler, Chicago, IL (US); Casey White, Chicago, IL (US); Daniel Roti, Libertyville, IL (US); John Taseff, Hoffman Estates, IL (US); Christophe Massart, Bromma (SE)

(73) Assignee: UNITED MACHINING MILLS AG, Meyrin (CH)

( * ) Notice: Subject to any disclaimer, the term of this patent is extended or adjusted under 35 U.S.C. 154(b) by 492 days.

(21) Appl. No.: 18/033,682

(22) PCT Filed: Oct. 22, 2021

(86) PCT No.: PCT/IB2021/059752
§ 371 (c)(1),
(2) Date: Apr. 25, 2023

(87) PCT Pub. No.: WO2022/090879
PCT Pub. Date: May 5, 2022

(65) Prior Publication Data

US 2023/0367291 A1 Nov. 16, 2023

Related U.S. Application Data

(60) Provisional application No. 63/106,479, filed on Oct. 28, 2020.

(51) Int. Cl.
*G05B 19/4155* (2006.01)

(52) U.S. Cl.
CPC .................... *G05B 19/4155* (2013.01); *G05B 2219/33099* (2013.01)

(58) Field of Classification Search
None
See application file for complete search history.

(56) References Cited

U.S. PATENT DOCUMENTS

2003/0014498 A1* 1/2003 Kreidler ............. G05B 19/4063 709/217
2014/0371898 A1* 12/2014 Chung ................ G05B 19/408 700/169

(Continued)

FOREIGN PATENT DOCUMENTS

EP 3636812 A1 4/2020
EP 2796240 B1 4/2021

OTHER PUBLICATIONS

International Search Report and Written Opinion for Int. App. No. PCT/IB2021/059752, mailed Feb. 16, 2022.

*Primary Examiner* — David Earl Ogg
(74) *Attorney, Agent, or Firm* — MCDONNELL BOEHNEN HULBERT & BERGHOFF LLP

(57) ABSTRACT

A system for data collection and organization from computer numerical control (CNC) machine tools comprising: a CNC machine configured to machine a plurality of parts; a data collection platform configured to receive program data, wherein the data collection platform is in communication with the CNC machine; and a controller comprising at least one processor and a non-transitory computer-readable medium wherein the non-transitory computer-readable medium stores a set of program instructions, wherein the at least one processor executes the program instructions so as to carry out operations, the operations comprising: receiving (Continued)

program data through the data collection platform, wherein the program data includes a set of instructions; machining, based on the set of instructions, the plurality of parts; and sending, to the data collection platform, machine data gathered during the machining process.

8 Claims, 9 Drawing Sheets

(56) References Cited

U.S. PATENT DOCUMENTS

| | | | | |
|---|---|---|---|---|
| 2016/0349739 | A1* | 12/2016 | Satake | G05B 19/4083 |
| 2018/0085577 | A1 | 3/2018 | Agudelo | |
| 2018/0164757 | A1* | 6/2018 | Matsushima | G06N 3/088 |
| 2018/0246497 | A1* | 8/2018 | Wolf | G05B 19/4068 |

* cited by examiner

SYSTEM FOR ACCESS AND ORGANIZATION OF DATA FROM COMPUTER NUMERICAL CONTROL MACHINE TOOLS

CROSS REFERENCE TO RELATED APPLICATIONS

The present application is a U.S. National Phase Application pursuant to 35 U.S.C. § 371 of International Application No. PCT/IB2021/059752 filed Oct. 22, 2021, which claims priority to U.S. Provisional Patent Application No. 63/106,479 filed Oct. 28, 2020. The entire disclosure contents of these applications are herewith incorporated by reference into the present application.

TECHNICAL FIELD

The present disclosure relates generally to a system for data collection and organization from computer numerical control machine tools.

BACKGROUND

Computer Numerical Control (CNC) machines are typically used for the mass production of detailed parts and tools. CNC machines include the automated control of a motorized maneuverable tool. These machines typically require the oversight of an operator. The operator may load onto the CNC machine program instructions for the machine to execute. Based on the instructions, the CNC machine may machine detailed parts and tools.

The process of CNC machining not only creates a part, but yields large amounts of data related to the process. The data types may include machine data, program instructions, measurements, recordings, and the actual part. During operation, changes may be made to the program instructions that are currently being executed, but the changes and any user notes may not be saved to the program instructions. Additionally, monitoring of the CNC machine is typically in real time without a way to review past operations. Currently, most of the data produced during the machining process is not stored or organized. Moreover, if any of the data related to the process is stored, it is stored as separate groups of data types without any correlation between the data types. A system to store, organize, and gather data from CNC machining, which allows for that data to facilitate future process improvements, machine training and knowledge transfer does not exist.

As of now, any gathering of data typically occurs in person. Currently, a business may own a CNC machine that is operated by an employee of the business to create the business's products. Operation, control, and monitoring of CNC machines typically occurs on-site at the business. It is recommended that customers who purchase CNC machines should have a large enough project that they can fully utilize a CNC machine. Otherwise, from a global cost perspective, if a CNC machine is not fully utilized, it is less profitable to purchase and operate one. However, many new customers do not have a project of large enough scope that it will fully utilize a CNC machine. Therefore, it could be beneficial for a plurality of customers to remotely own a portion of a single CNC machine at a central location. However, multiple issues exist for the prospect of remote CNC machine operation.

Being a remote user exacerbates the problem of not having access to data produced during the CNC machining process. For example, a remote user will not have access to a variety of data, such as visual, audible, tactile, and numerical data. Even if the data was reported to the remote user, it would be difficult to organize and make sense of given the large amount. Successful operation of a CNC machine requires knowledge of this variety of data and based on the data, planning and testing the manufacturing process, evaluating the results of the process, and improving the process.

Commercial platforms do not provide remote interactions with the machine tool cell and associated process, nor do they capture the rich process data. A set of tools is sought after to allow a machine owner to accomplish productive work with a CNC machine tool, capture the rich data set that is produced during the machining process and allow for that data to facilitate future process improvements, machine training and knowledge transfer. This same set of tools may allow a remote machine owner to own a fraction of a CNC machine tool.

SUMMARY

The embodiments described herein generally relate to a system and associated methods for data collection and organization from a CNC machine. Particularly, the system for data collection and organization from a CNC machine may include a data collection platform configured to collect and organize a wide range of data related to programming and operating a CNC machine. The system may also include a plurality of detection sensors to remotely monitor the operation of the CNC machine, and a part measurement device to check the output of the CNC machine.

Further the disclosure may relate to utilizing the data collection platform to remotely provide and update instructions for the CNC machine, store and organize the instructions and any changes, monitor the operation of the CNC machine, link the instructions, the updated instructions, the output parts, and the measurements of the parts, and it may include a data cache for user notes and the relevant data. By collecting and organizing the data related to programming and operating CNC machines, this may allow for more efficient process development, possibly improved machine training, possibly improved hand-off from one operator to another, possibly improved traceability and the opportunity for machine learning. It could also assist in the remote ownership and operation of a CNC machine.

In one aspect, the present application describes a system for data collection and organization from computer numerical control (CNC) machine tools. The system may include a CNC machine configured to machine a plurality of parts and a data collection platform configured to receive program data. The data collection platform may be in communication with the CNC machine. The system may also include a controller. The controller may include at least one processor and a non-transitory computer-readable medium. The non-transitory computer-readable medium may store a set of program instructions and the at least one processor may execute the program instructions so as to carry out operations. The operations may include receiving user input in the form of program data, including a set of instructions, through the data collection platform, and machining, based on the set of instructions, the plurality of parts. Data gathered during the machining process may then be sent to the data collection platform.

An example embodiment of the following disclosure describes a system and architecture for data collection and organization from CNC machine tools that allows a machine owner to accomplish productive work with a CNC machine tool, capture the rich data set that is produced during the machining process, present that data to a user, and allows for that data to facilitate future process improvements, machine training and knowledge transfer. The system may also allow for remote operation and utilization of a CNC machine.

The system may include a CNC machine, at least one measurement device and a plurality of detection sensors. The at least one measurement device and the plurality of detection sensors may be located within the CNC machine. Alternatively, they could be outside of the CNC machine.

The disclosure may further discuss a data collection platform in communication with the CNC machine as part of the system. A user's input parameters may be added to the data collection platform. The parameters may include program instructions for the CNC machine to create a part, including the dimensions of the part. The CNC machine may create the desired part based on the user's input parameters. Detection sensors may monitor the CNC machine process of creating. Then, once the part is finished, a measuring device may measure the final dimensions of the part. These outputs of the machining process may also be added to the data collection platform.

The data collection platform may further allow a machine owner to access and utilize the CNC machine to develop machining processes and produce parts. The system may receive, store and organize CNC machine data for a user to review.

The data collection platform may also provide web-based access to the local physical tools and local infrastructure normally accessed directly by the machine owner when they are interacting with their CNC machine locally. This may assist a remote user.

To further assist in data collection and operation of the CNC machine, the system may include a parameter and output association architecture. The parameter and output association may associate parameterized programs along with any output artifacts from the programs. For example, dimension values, any video footage from the creation of the part, any machine data output during the program run, and the measurements of the resulting parts may be linked back to the original program instructions. The parameter and output association may be accessed through the data collection platform.

The system may also provide for the replay of digitized operation with the CNC machine. For example, the system may capture and store operation data such as video footage from inside and outside of the machine, the input program instructions, the data gathered while creating the part, and the measurements of the part. The operation data may be stored in a remote database, such as a cloud-based database, and retrieved on a time-synchronized basis to display for a user to view and replay the operation data. The user may retrieve the data through the data collection platform.

Further, the system may provide specific timestamps, such as a bookmark, in the video footage. Finally, with the data collected by the system, the system could store the most important data that has relevance to a user to a specific cache. This may allow a user to more easily access the information.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

Example embodiments should become apparent from the following description, which is given by way of example only, of at least one preferred but non-limiting embodiment, described in connection with the accompanying figures.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Figure 1A:
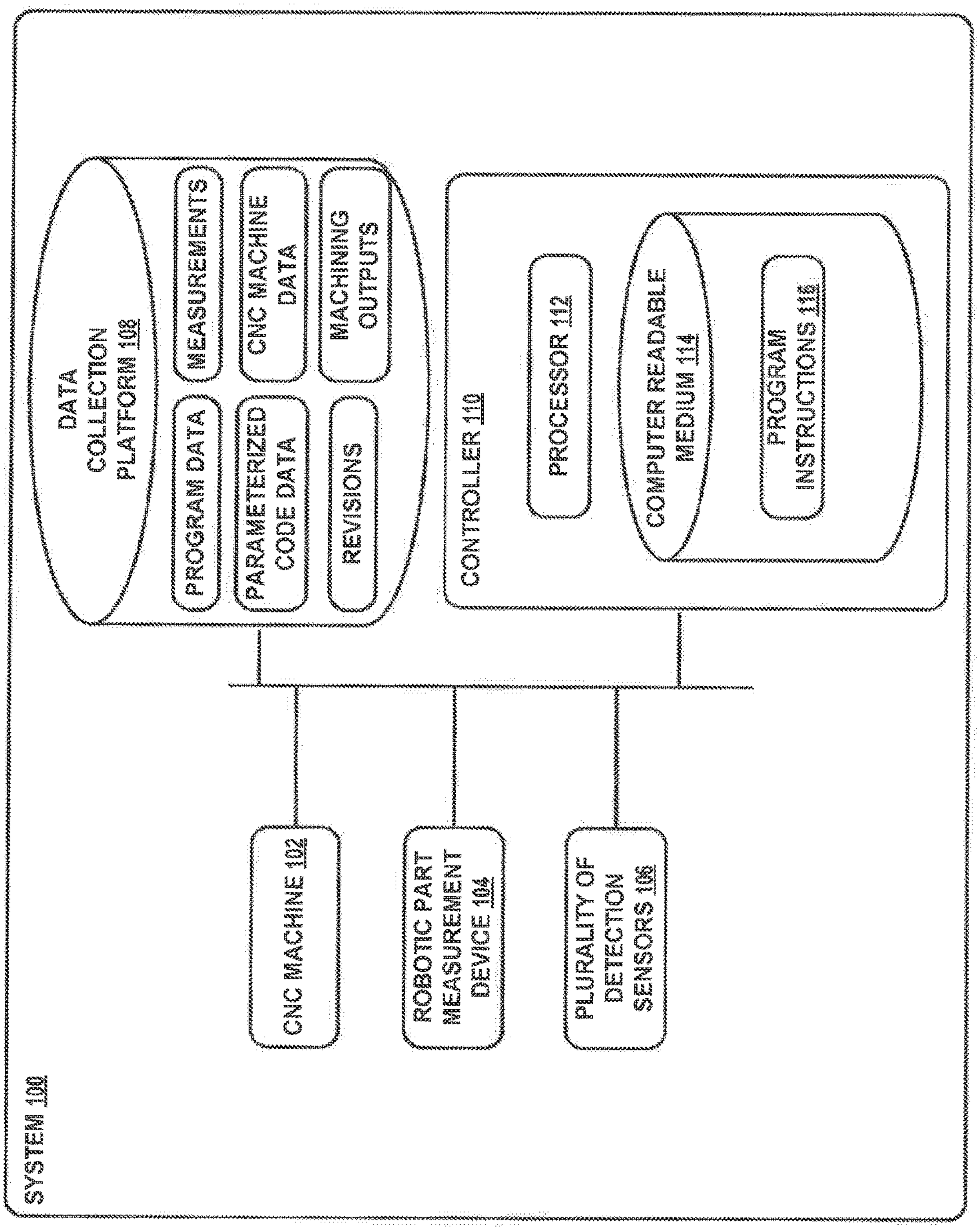
FIG. 1A illustrates a system for data collection and organization from computer numerical control (CNC) machine tools, according to an example embodiment.

FIG. 1A illustrates an example embodiment of a system 100 for data collection and organization from CNC machine tools. The system 100 may include a CNC machine 102 configured to machine a plurality of parts. The system 100 may also include a part measurement device 104 to measure the parts once they have been created, a plurality of detection sensors 106 to monitor the creation process for a remote user, and a data collection platform 108 configured to receive user input and machine data. The data collection platform 108 may be in communication, such as through a web-based or cellular platform, with the CNC machine 102 so that a remote user could provide the instructions for the CNC machine 102. Through this communication method, the data collection platform 108 can also receive feedback about the creation process, such as operation data. The data collection platform may store data so as to allow a user to access parameterized code data, program data, revisions to the parameterized code, revisions to the program data, measurements of the finished part, CNC machine data such as videos of the machining, and other machining outputs.

The system 100 may further include a controller 110. The controller 110 may include at least one processor 112 and a non-transitory computer-readable medium 114. The non-transitory computer-readable medium 114 may store a set of program instructions 116 and the at least one processor 112 may execute the program instructions 116 so as to carry out operations for controlling CNC machine 102 and creating a part. The operations may include executing program instructions that are stored on the data collection platform and sent to the CNC machine.

In one embodiment, the system 100 may facilitate collection and organization of a wide range of data related to programming and operating a CNC machine. For example, the data related to the program instructions for a part, the machine data from creating the part such as data stream flag and video footage, and the measurements could be collected and organized on the data collection platform 108. This embodiment of the system 100 could facilitate "fractional ownership" and/or sharing of a CNC machine 102. For example, multiple remote owners could own a fraction of a local CNC machine 102. Through the data collection platform 108, a fractional remote owner may enter user input for machining a desired part. The user input may be for creating any widget and is not necessarily limited to parts. The user input could include new or reused program data for machining a part that includes the specific blueprints for the part. The program for the desired part could be submitted through the data collection platform 108 to the local CNC machine 102 for the CNC machine 102 to create the part. The CNC machine 102 could be chosen from a variety of types. For example, the CNC machine 102 could be CNC milling machines, CNC laser cutting machines, CNC lathes, CNC drilling machines, CNC plasma cutters, and CNC grinders. A local machine operator may assist in preparing the CNC machine 102, in loading any of the needed materials, and ensuring that the instructions 116 in the program data is carried out.

While the part is being machined, the plurality of detection sensors 106 may observe what is going on inside of and around the CNC machine 102. In some examples, the plurality of detection sensors 106 may be cameras, microphones, pressure sensors, or any combination thereof. For example, cameras may be positioned both outside of the CNC machine 102 and in the interior of the CNC machine. The images and video captured by the camera may be uploaded or streamed to the data collection platform 108 for a remote user to review. The images and video could be streamed to the platform live. Alternatively, the images and video could be temporarily stored on a digital video recorder computer and uploaded to the platform at a later time. Video footage may be accompanied by audio as well. Moreover, the plurality of detection sensors 106 could be various sensors within the machine to determine a variety of factors such as if the machine is performing as expected, if the dimensions of the part are correct, or other factors. It should be understood that the plurality of detection sensors may comprise other known sensors or elements as well. Footage from the detection sensors may filtered into footage of interest depending on the operation that is being performed by the machine to reduce the amount of video streams that must be uploaded to the data collection platform, or displayed.

Once the part is created by the CNC machine 102, the part measurement device 104 may measure the final dimensions of the part in comparison to the program data in the user input. Through the measurement device 104, it can be determined if the machining process produced different dimensions than what was specified by the user. In some examples, the part measurement device 104 may comprise hand tools used by the local operator such as, for example, dial indicators, dial calipers, micrometers, or tape measures, a pneumatic gage, a coordinate measuring machine, an optical measurement system such as a measurement microscope, a structured light scanner, or a vision-based measuring system, and the like. The measurement device 104 may also include object detection sensors 106. The measurements from the measurement device may be uploaded to the data collection platform for further organization.

As mentioned above, in an example embodiment, the system 100 may further include a controller 110. Controller 110 may comprise control logic to cause the system to carry out particular operations including those described herein. As such, the controller 110 could take various forms, including but not limited to a programmed processing unit. The programmed processing unit may include at least one processor 112 (e.g., one or more general purpose microprocessors and/or one or more dedicated processing units) and non-transitory computer readable medium 114 (e.g., one or more volatile and/or non-volatile storage components, such as magnetic, optical, or flash storage) holding program instructions 116 executable by the processing unit to cause the processing unit and thus the system to carry out various operations described herein.

Figure 1B:
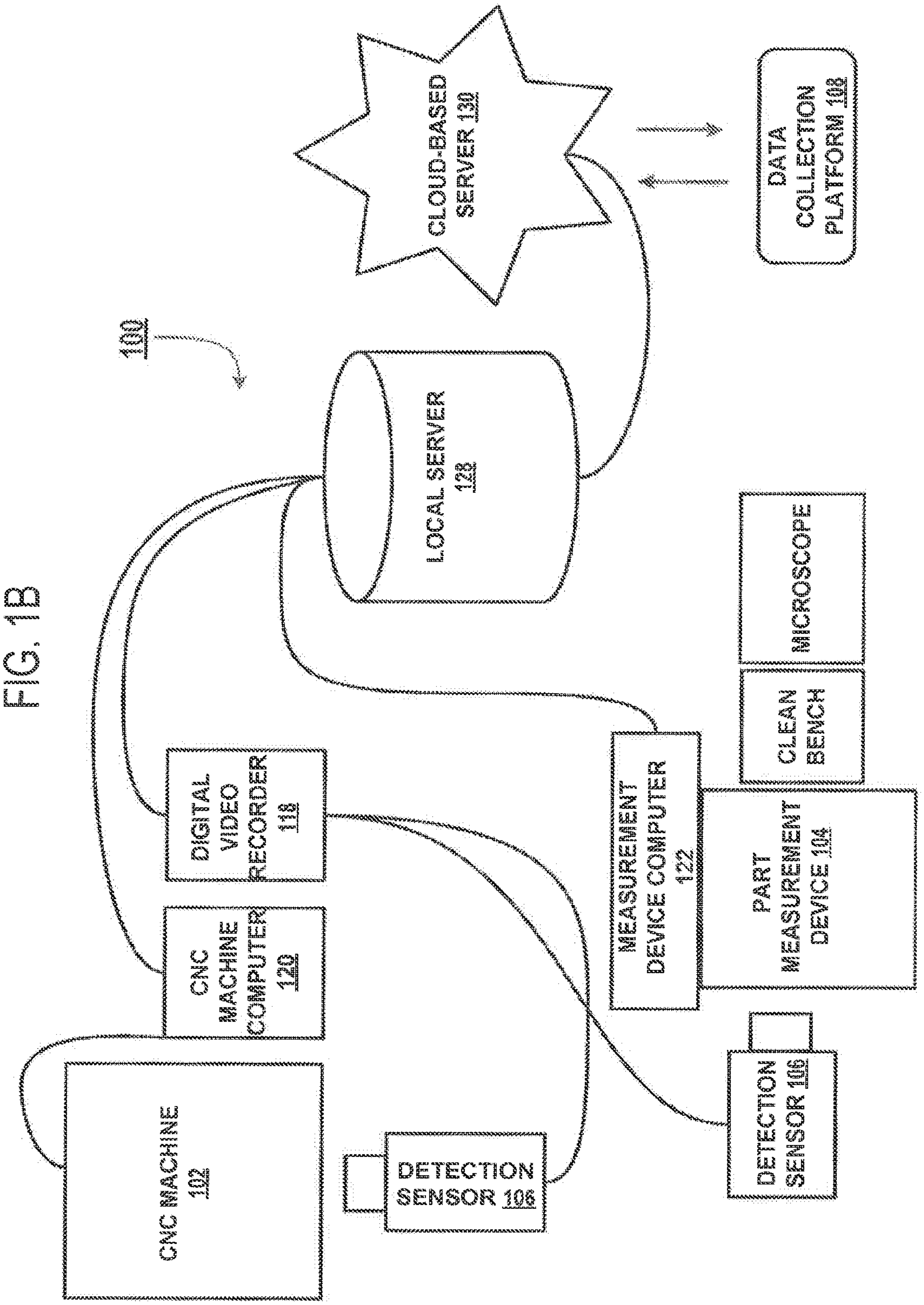
FIG. 1B further illustrates a system for data collection and organization from CNC machine tools, according to an example embodiment.

FIG. 1B further illustrates an example embodiment of system 100 for remote access of CNC machine tools and how the elements are laid out in relation to each other. For example, CNC machine 102 may be in communication with CNC machine computer 120. CNC machine computer 120 may be responsible for loading the program data that CNC machine 102 runs to create a part and for updating and recording any changes made to the program data. CNC machine computer 120 may receive program data from local server 128. Further, CNC machine computer 120 may monitor the machining process and record data gathered during the machining. CNC machine computer 120 may upload any data gathered to local server 128.

Part measurement device 104 may further be in communication with measurement device computer 122. Measurement device computer 122 may record all of the measurements taken by the part measurement device 104. The measurements may be uploaded from measurement device computer 122 to local server 128. Part measurement device 104 and CNC machine 102 may both be monitored by a plurality of detection sensors 106. The detection sensors 106 may monitor the process of machining the part and of measuring the part. The plurality of detection sensors 106 may feed into a digital video recorder 118 that also uploads all of the data gathered by the plurality of the detection sensors 106 to local server 128. Data may be uploaded to local server 128 and downloaded from local server 128 over a wireless internet connection. Alternatively, CNC machine computer 120, digital video recorder 118 and measurement device computer 122 may be hardwired to local server 128.

In an example embodiment, local server 128 may be backed up and in communication with cloud-based server 130. Local server 128 may store data to cloud-based server 130, but may also retrieve data, such as program data, from cloud-based server 130. The data collection enabled by this architecture are valuable for process improvement, debugging, training and other purposes. Data collection platform 108 may also be in communication with cloud-based server 130. Data could be uploaded to the local server 128 from local machines and then sent through the cloud-based server 130 to the data collection platform 108. Further, in an example embodiment, data that is in use by the user may be stored at the data collection platform 108, but data that is not currently being organized or analyzed may be stored at cloud-based server 130.

Figure 2:
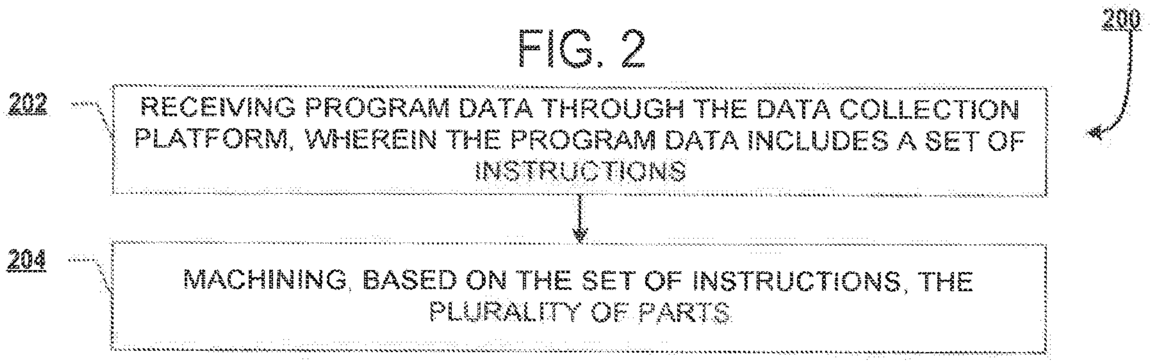
FIG. 2 illustrates a flow chart of operations for data collection and organization from CNC machine tools, according to an example embodiment.

The communication between elements in the system may assist in facilitating the operations carried out by the processing unit. FIG. 2 illustrates operations 200 that may be carried out by an example embodiment of the system for data collection and organization from CNC machine tools. The system 100 may be designed to collect and organize a wide range of data related to programming and operating a CNC machine for a user to access and review. The system 100 may also provide remote access to the local physical tools and local infrastructure normally accessed directly by the machine owner when they are interacting with their CNC machine locally. This data collection and organization for remote access combines in one platform the a) machine user interface/control, b) cameras providing a view into and around the machine, c) a repository for machine programs, d) a database for results/measurements/data/video coming from the CNC machine and other supporting tools and e) a system for replaying the operation of the CNC machine.

As shown in FIG. 2, at block 202, the operations 200 may include receiving program data through the data collection platform, wherein the program data includes a set of instructions. The remote user may enter the program data into the data collection platform that may be on a computer interface local to the remote user. The program data may be stored on a cloud-based server. The program data may be saved on the cloud-based server for future use as well. From there, the program data may be downloaded to a server that is local to the CNC machine and onto a CNC machine computer which may be used as a set of instructions to machine a part, or part. As previously discussed, the set of instructions may include the dimensions of the part. Once the program data is at the CNC machine, the operations may include, at block 204, machining, based on the set of instructions, the plurality of parts.

The data gathered during the operations, such as the user program data, machine data, video recordings of machining, part measurements, and video recordings of measurements may then be stored as manufacturing data for a remote user to review and build upon for future projects.

Figure 3:
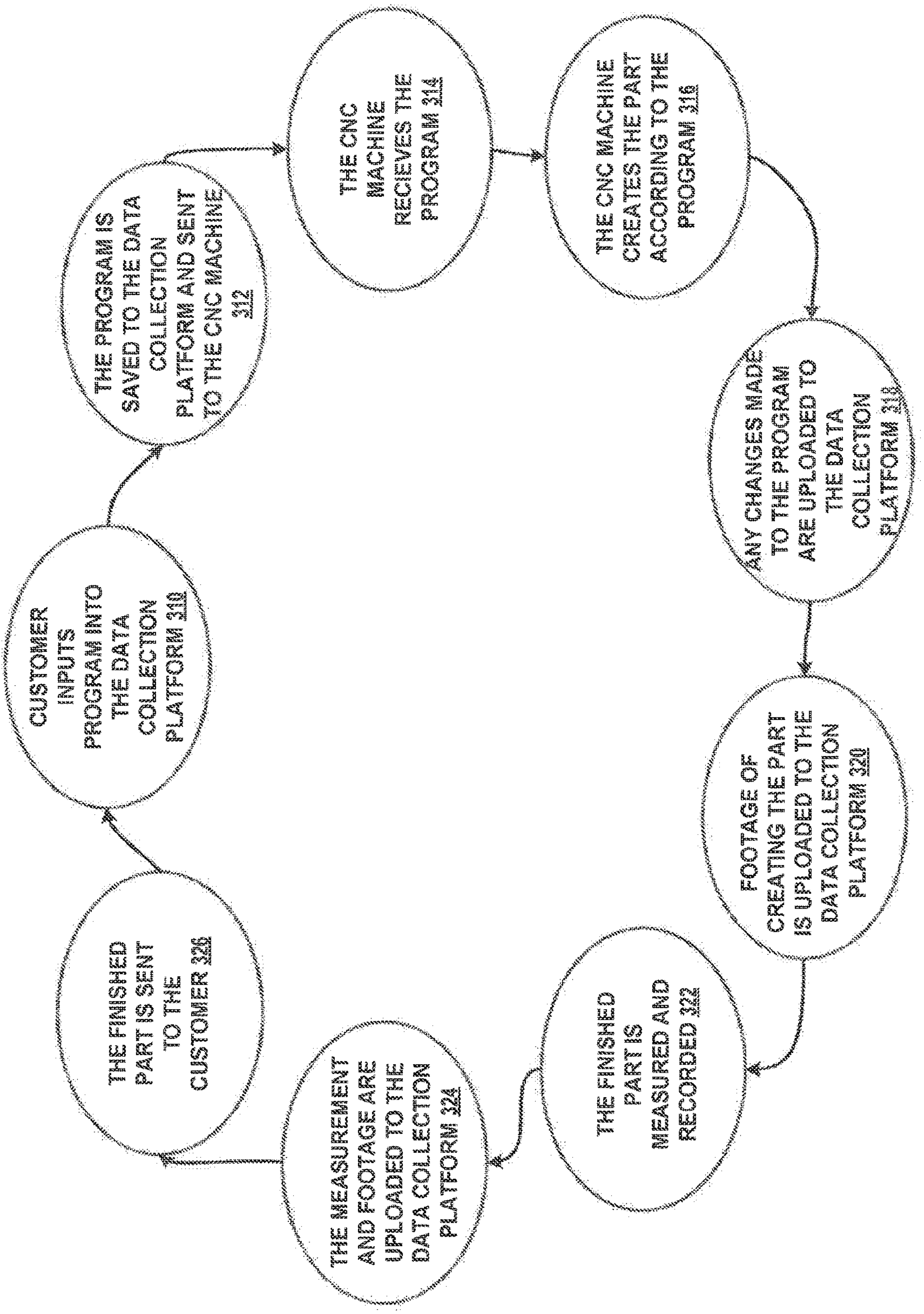
FIG. 3 further illustrates a flow chart for data collection and organization from CNC machine tools, according to an example embodiment.

FIG. 3 further illustrates a flow chart of an example embodiment of a system for data collection and organization from CNC machine tools and how the system may be used in practice. At block 310, a customer may input a program for creating a part into the data collection platform. The program may include data for a CNC machine to implement in machining the part. At block 312, the program may be saved to the data collection platform and from there sent to the CNC machine. At block 314, the CNC machine may receive the program, and at block 316 the CNC machine may create the part according to the program. During the machining, the CNC machine may gather data from the machining process, such as video footage of the resulting process and machine data ouput during program run and upload it to the data collection platform. Further, at block 318, any changes that are made to the plan at the CNC machine are uploaded to the data collection platform. The data collection platform may be located at or in communication with a cloud-based server. The data collection platform may be used for customer review, for parameter and output association, or for training a machine learning model. At block 320, footage of creating the part is also uploaded to the data collection platform. At block 322, the finished part is measured by the measurement device and recorded for a user to review. At block 324, the measurement and footage of the measurement may also be uploaded to the data collection platform. Finally, at block 326, the finished product may be sent to the customer. The example embodiment may particularly assist a user that is remote to the CNC machine.

CNC machine tools utilize programs to instruct the machine to perform desired movements and functions. These movements and functions are created in such a way so that the machine produces a desired physical output. For example, in the case of metal cutting CNC machinery, the CNC program is setup to produce the desired cut in the workpiece material, with certain dimensions, tolerances, speed and other factors. During the creation and use of CNC programs it can be valuable to maintain a record of the exact versions of the program (e.g. for debugging purposes, process development and iterative development work, traceability and other factors).

Figure 4A:
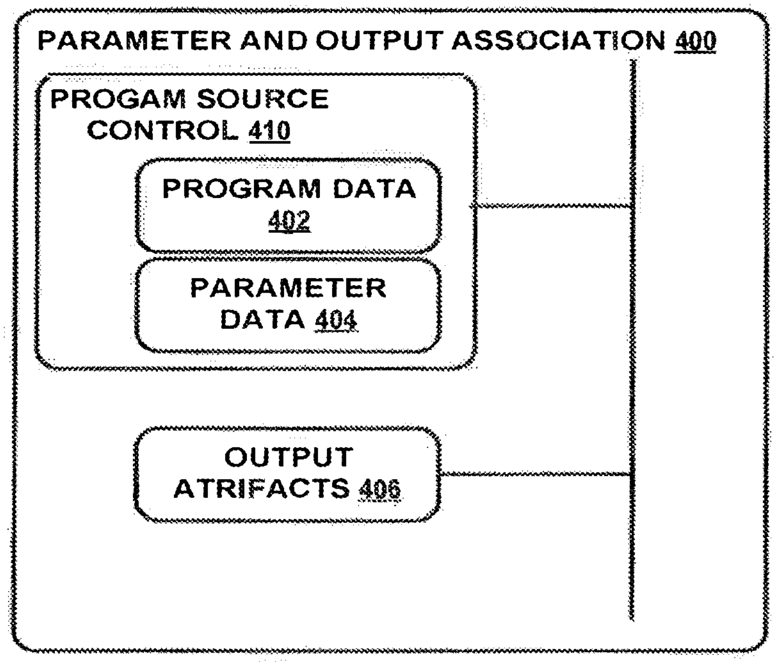
FIG. 4A illustrates a system for parameter and output association, according to an example embodiment.
Figure 4B:
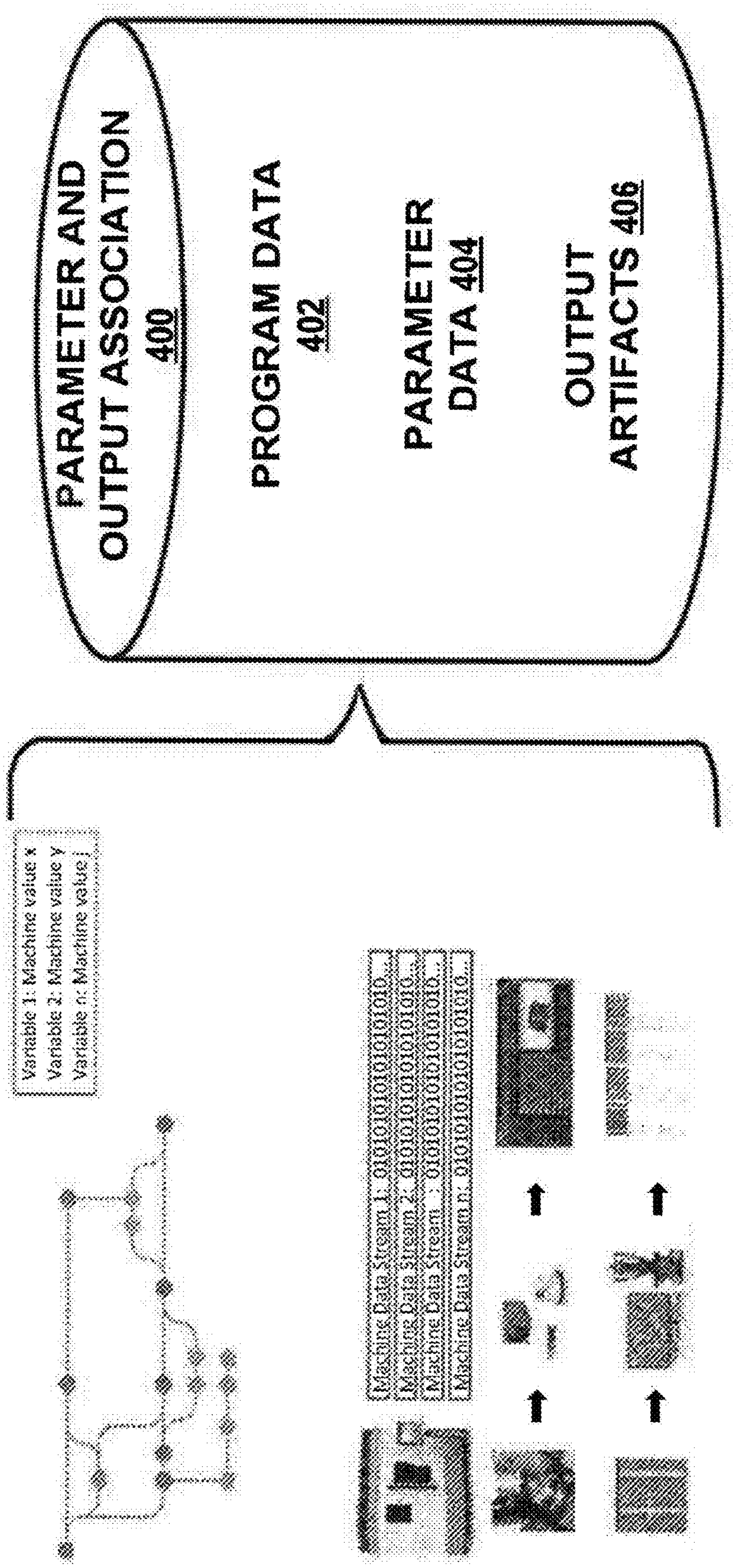
FIG. 4B further illustrates a system for parameter and output association, according to an example embodiment.

FIGS. 4A and 4B illustrate an example embodiment of a parameter and output association 400 to assist in data collection and organization from CNC machine tool processes. The data collection platform 108 may include the parameter and output association 400 to assist in the development, maintenance and record keeping of CNC machine tool processes. Parameter and output association 400 may associate program source 410 control with output artifacts 406 from the machining process. Program source control 410 could be considered the version control of the program data 402, or the version of the program data 402 that was run on the CNC machine to cut the part. During the process of creating program data to create a part via a CNC machine, CNC programs for parts could be parameterized to simplify the iteration process when designing new CNC programs and processes. Program source control 410 may include the program data 402 and parameter data 404 from parameterized code data as well as a record of the revisions to the program data 402 and revisions to parameter data 404 within the program The version of the program data 402 that was run at a particular point in time could be associated with output artifacts 406 from the cutting process, such as video of the resulting process, machine data ouput during process run, measurements of the resulting features/parts produced by the process, status of the machine during the production process etc. Parameter and output association 400 may attempt to improve traceability, insight for the user into parameter changes over time and their effects on the resulting artifacts, and a possibility for greater machine learning.

As previously mentioned, parameter data 404 allows for values to be easily changed within a program. For example, parameterized data may be a program for creating a part on a CNC machine that has blank values for the dimensions. Parameter data 404 may allow for easy reuse of programs with different values. Program data 402 may include the parameter data 404 that has been completed with values and is run by the CNC machine to create the part.

When parameter data and output data are linked together, a search on a computing device of one element of the parameter and output association 400 could provide information about the associated linked element. For example, if a user selects a certain parameterized code, program data associated with that code may become available on the data collection platform. In another example, if a user searches program data, the video of the resulting process may become available for the user to view as well.

The program data 402, parameter data 404, and output artifacts 406 may be linked by a local computing system. The linking may be done via a central database and time-offset constants that allow the various streams to be correlated. Alternatively the link may be performed by a computing system that is programed to recognize similarities in the data. For example, the computing system may recognize similarities in language between parameter data and program data. Further, the computing system may recognize when parameterized code is turned into program data and link the two together. Additionally or alternatively, the computing system may recognize similar timestamps. For example, the computing system could associate program data with video footage of the process because the program data was run at the same time the video footage was being created. Machine learning could also be implemented to improve on the recognition and association. In an alternative embodiment, the remote user could be sent a prompt from the computing system to link together the program data 402, parameter data 404, and output artifacts 406.

As discussed, a local computing system may establish the links. Information detailing the links may then be uploaded to a cloud-based server. From there, the parameter and output association 400 may be accessed by a remote user on the data collection platform. The parameter and output association 400 may be used to autofill a value into the parameter data 404 to get program data 402. Machine learning may also be implemented to autofill a value into the parameter data 402. The machine learning model could be trained on past program data, or output artifacts. Specifically if any errors were identified in the output artifacts the machine learning model will learn to avoid or correct parameters that caused errors.

In some embodiments, the system 100 may also be capable of providing a replay of the manufacturing process executed on the machine tool as well as the interaction between the machine and a human operator after the process has run and/or the interaction has occurred. The system 100 may include multiple data pipelines, a storage database, retrieval method, and display for a consumer of the data in an attempt to assist in remote operation, training, and institutionalized knowledge capture.

Figure 5:
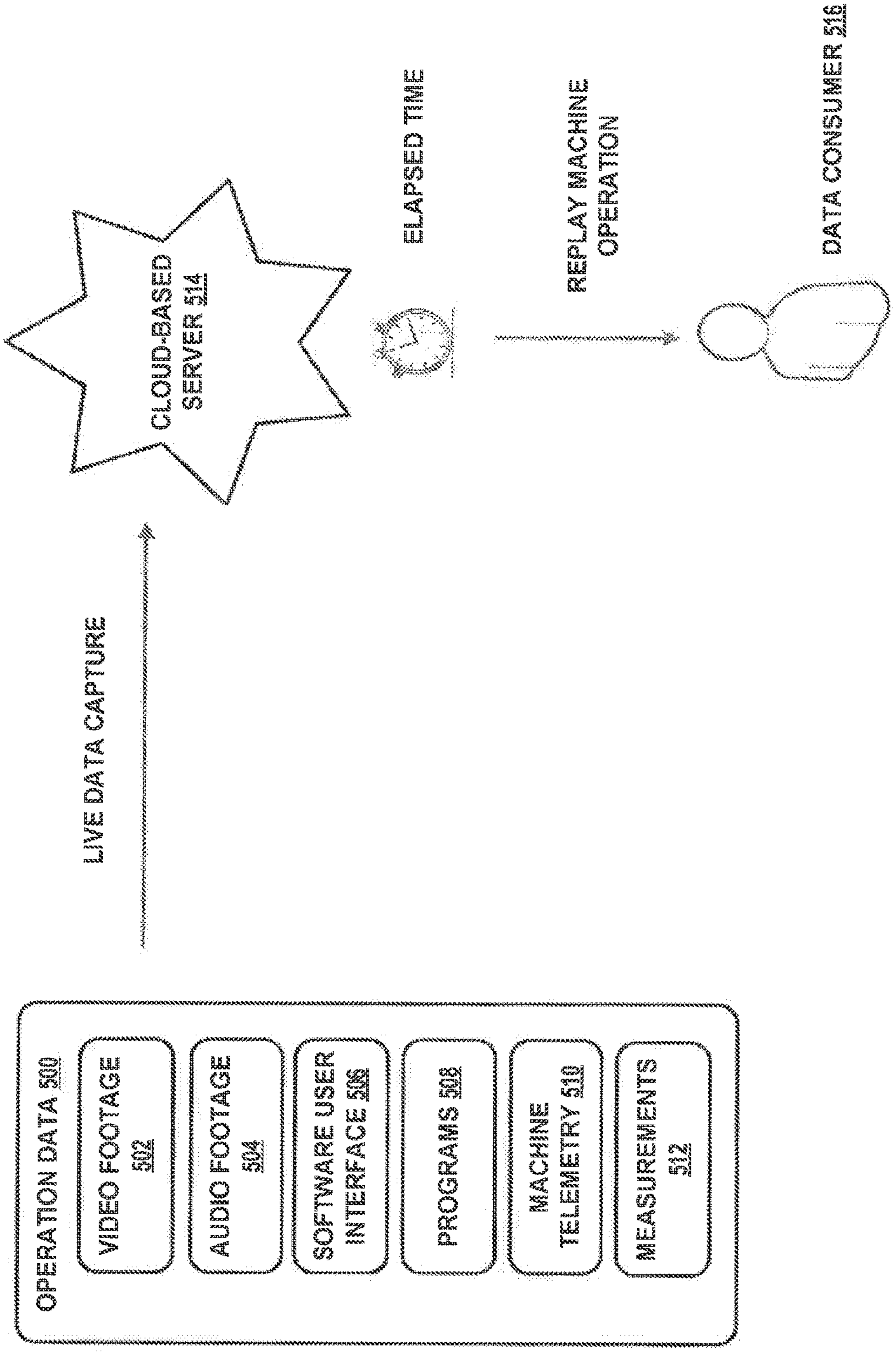
FIG. 5 illustrates a system for replaying digitized operations, according to an example embodiment.

When machining the plurality of parts in the CNC machine 102, the plurality of detection sensors 106 may monitor the machining and record the operation data. FIG. 5 illustrates an example embodiment of a system and method for replaying digitized operation data 500 to assist in remote access of CNC machine tools. Operation data 500 may include video footage 502 inside and outside of the machine, audio footage 504, recordings of the software user interface 506, programs 508 run on the machine (i.e., process inputs), interactions between the operator and the CNC machine, and process data generated by the machine tool and peripheral devices such as machine telemetry 510 and measurements 512 of the part (i.e., process outputs). At least a portion of the operation data 500 may be captured live by the detection sensors during the machining process and stored as a recording in a cloud based server 514. The data collection platform 108 may be stored on the cloud-based server 514 as well. The operation data may be specifically stored and organized on the data collection platform 108. The system may include a method to 1) capture key attributes of the operation data 500 live; 2) store the operation data 500 in the secure cloud-based server 514; and 3) retrieve the operation data 500 from the cloud-based server 514 such that the retrieved data is time-synchronized. The system may further include an interface, such as the data collection platform, to view the retrieved operation data.

The operation data 500 may be gathered through multiple data pipelines in a plurality of ways. For example, video footage 502 and audio footage 504 may be captured by the detection sensor 106 as streams and may include footage from both inside of and outside the CNC machine 102. The video footage 502 may include one or more views of the internals of the machine, including detailed views of the material processing happening within the machine. The multiple views of the video footage streams may be combined into one channel that contains the views that are of the most interest. A channel may be a distinct grouping of different streams into one. For example, a first video footage stream may include footage from the outside of the machine 102, which is relevant for gathering information before machining begins. A second video footage stream may include footage from the inside of the CNC machine, which is relevant for gathering information during the machining. The channel may include portions of the first video stream to show the outside of the machine before the machining begins, and then the channel may switch to the second video footage stream during the machining process. This way, the footage of interest is combined into fewer video streams to actually send to the cloud.

Further, software user interface 506 could be a recording of the operator's screen, as the operator facilitates the machining process. The programs 508 run by the machine and the recording of the operator's screen may also be uploaded as operation data 500. Data gathered by the machine during operation, i.e. machine telemetry 510, may also be uploaded as operation data 500. Machine telemetry 510 may include data on how the CNC machine is running, and if the machine runs into any errors. Finally, output data from the process may be uploaded to the cloud-based server 514 as operation data 500. Output data may include measurements 512 of the finished part. The measurements 512 may also include camera or video footage of the measurements 512.

The data is collected by the local computing system at the CNC machine 102 and then uploaded to the cloud-based server 514 for storage. Specifically, the data may be stored on the data collection platform 108 on the cloud-based server 514. From the cloud-based server, a data consumer 516 may be able to retrieve the operation data 500 from the cloud-based server 514. The data consumer, 516 may be the remote user of the CNC machine system. This way, the data consumer 516 may be able to review the operation data 500 in real time (live), or as a recording at a later time.

As previously discussed, in an example embodiment, the system 100 may capture video footage of the machining process as well as program data and other machine events. The present disclosure may also provide a system for associating the video footage, program data, and machine events with a specific timestamp in order to "tag" them. This association could provide a hierarchical tree of events which can be enumerated and used to "jump" to that specific event in the related video stream.

Currently, these video streams may be long in duration and there is no way for a user to filter for and find relevant or interesting moments in the video for analysis. An example embodiment may include operations that the recording of the video footage includes bookmarks at specific times based on the set of instructions in the program data.

Figure 6:
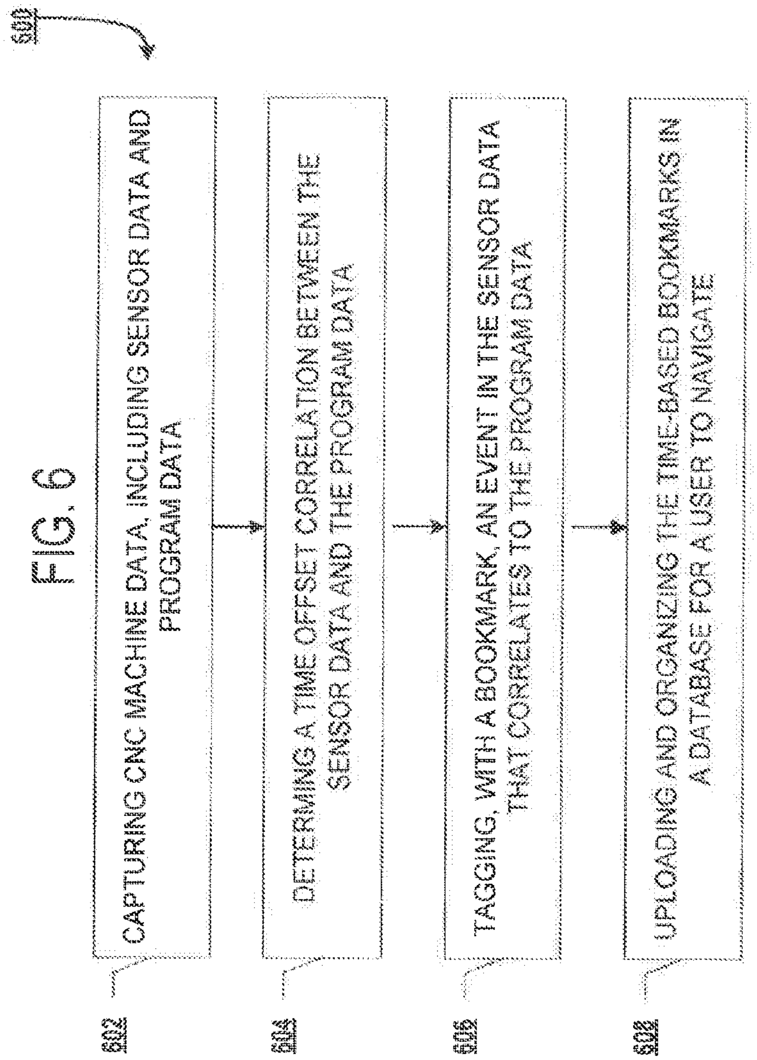
FIG. 6 illustrates a flow chart for associating video footage, program data, and machine events with a specific timestamp, according to an example embodiment.

As shown in FIG. 6, at block 602, the operations 600 may include capturing various data, including sensor data, from the CNC machine. The sensor data could be, for example, video footage or audio footage and the data from the CNC machine may be the program data including the instructions, and machine telemetry. As shown at block 604, the sensor and CNC machine data may be input into an algorithm that utilizes a "Time=O" concept in order to determine a time offset correlation between the data inputs. The time-offset could be used to find not only the video of an event, but also sensor and other data on either temporal side of this offset, giving the user an enhanced overview of an entire machine session. For example, a specific line of code may be assigned a run time, based on the length of running the program data on the CNC machine. As shown at block 606, that run time may be associated with a specific clip of video footage. Therefore, a user could view the video from a specific portion of the instructions in the program data. The video may also be associated with machine telemetry, so that if an event occurs in the CNC machine during the machining process, it is flagged with a time-based bookmark in the video for a user to review.

Once the video is recorded, it may be stored in a database that is organized by time-based bookmarks that are further associated with specific events in the program data, as shown at block 608. The system may also include navigation between the bookmarks. For example, a user may be able to jump between points of interest in the timeline based on the bookmarks.

In an additional or alternative embodiment, machine learning may be used to automatically associate specific events in the video footage with program data and CNC machine data. CNC machine data could include OPC or UA data stream flags. The machine learning model may be trained based on the time associations between what the video footage displays compared to a line of code in the instructions of the program data. The trained machine may then recognize how an event in the video corresponds to code. This may assist in flagging any errors that occur when video footage does not match program data.

As data is generated by the different CNC data sources, it is stored to a backend database. However, this can be slow to access, and may not provide the most up-to-date version of data if many changes are being ingested. To address this and provide up-to-date information to users, important information may be cached, rather than retrieving it from a backend database. Important information may be any information that has direct relevance to the user as well as any information the user generates. The user's version of data may become a subset of the backend database, but may also allow for the user to make modifications and add data.

Figure 7:
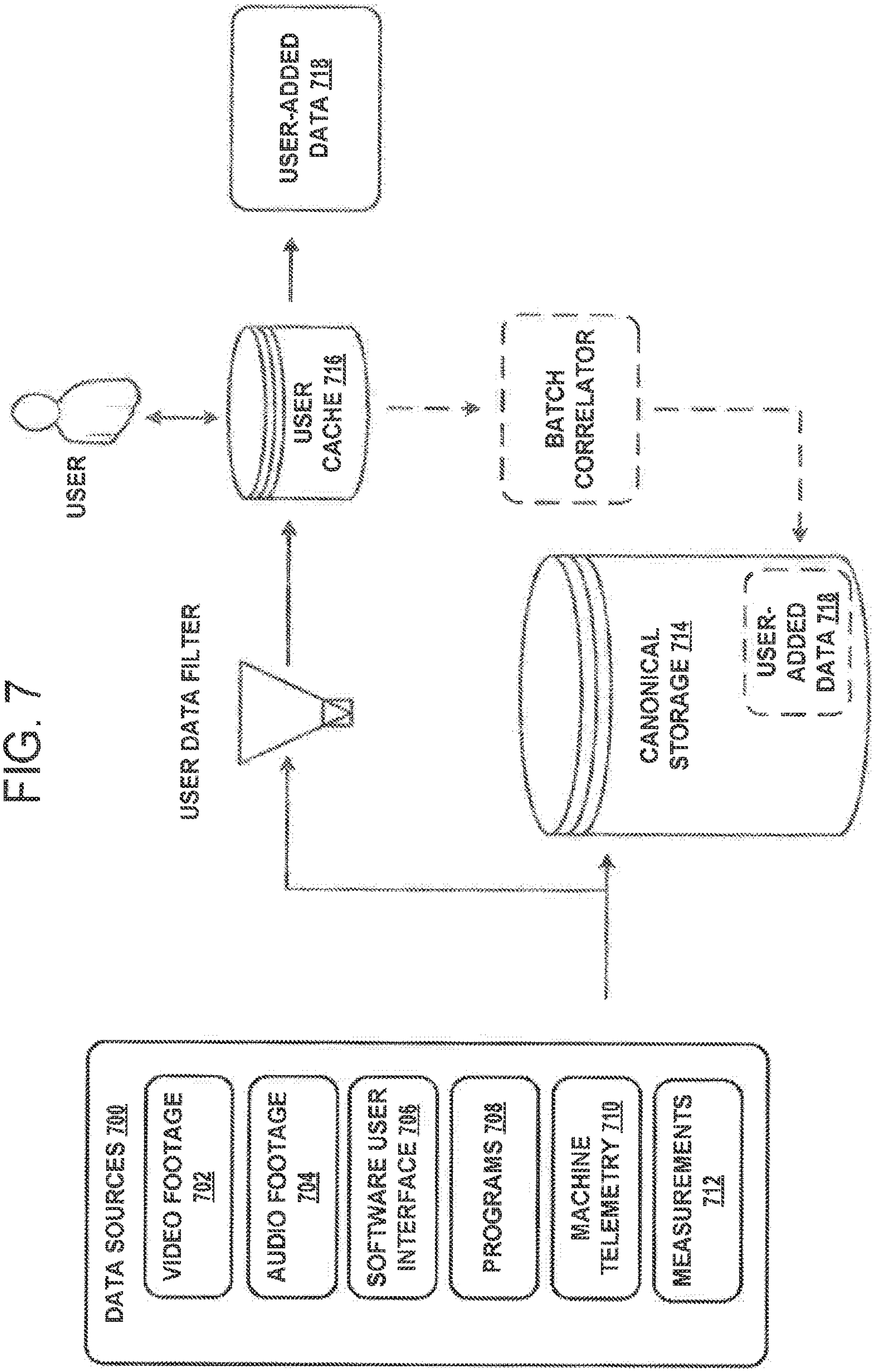
FIG. 7 illustrates a system for data caching, according to an example embodiment.

The present disclosure may include correlating these datasets, in such a way that the backend eventually becomes consistent with the user's changes. FIG. 7 illustrates an example embodiment of a system and method of filtering data, such as video recordings and machine telemetry, to determine data of interest, and saving the data of interest to a user cache 716. Given the number of data sources 700, as previously discussed, the large amount of data in the system overall makes simultaneously providing all possible data streams infeasible. The data sources 700 could include video footage 702, audio footage 704, software user interface 706, programs 708, machine telemetry 710, and measurements 712. The system could include a writeable subset of the overall data in an attempt to rapidly inform the user of process events, while allowing the user to include user-added data 718. User-added data 718 gives the user the opportunity to make contemporaneous notes, observations, or provide other feedback. User-added data 718 is important for later review and analysis of the program.

In order to avoid the latency of database write, user-added data 718 may not initially be written to long-term storage. After the CNC process has completed, the user-added data 718 may be uploaded, and asynchronously integrated with the canonical storage 714 in the backend database. The amount of data, the importance of time-based information within it, data security requirements, and the need to maintain a good dataset for review and analysis are all challenges in seamlessly merging the user-added data 718 into the canonical storage 714.

In order to manage the bandwidth required to transfer data, the data in the data sources 700 is filtered, and a subset of the complete dataset is stored to a user cache 716 for the user. This subset may be information that is only the most relevant for the user at the moment. When the user adds information, such as user-added data 718, to the dataset in the user cache 716, the change is made within the user's copy instead of on the backend server. This allows a near-instantaneous feedback loop, where user-added data 718 is instantly available to the user. The user cache 716 may include advanced correlation tracking, to ensure that when the dataset is eventually merged, any new data will fit into the larger dataset in the right order. Advanced correlation tracking could include real-time detection, tracking, and classification of data to determine the right location for updated data.

Once user operation is complete, the user cache 716 is submitted, and any changes are compared against the data stored within the canonical storage 714 through a batch correlator. The canonical storage 714 verifies the user's changes, and inserts any user-provided data items. The user cache 716 can now be cleared, as all information it contained is now contained within the canonical storage 714.

This embodiment of data cache and long-term storage may provide a curated set of data to the user for performance reasons, and accept user updates as a batch, instead of one at a time. This provides that user-generated data is immediately available to the user for review. It simplifies the real-time data processing and ingestion by limiting the input data to well-known and understood devices, while supporting ad-hoc user-generated content. It further provides greater insight during review and analysis by supporting both digitally-generated events as well as human observations, and keeping both within an ordered database.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The invention claimed is:

1. A system for data collection and organization from computer numerical control (CNC) machine tools comprising:
- a CNC machine configured to machine a plurality of parts;
- a plurality of detection sensors; and
- a data collection platform configured to receive program data, wherein the data collection platform is in communication with the CNC machine;
- a controller comprising at least one processor and a non-transitory computer-readable medium wherein the non-transitory computer-readable medium stores a set of program instructions, wherein the at least one processor executes the program instructions so as to carry out operations, the operations comprising:
  - receiving program data through the data collection platform, wherein the program data includes a set of instructions;
  - machining, based on the set of instructions, the plurality of parts;
  - monitoring the machining the plurality of parts with the plurality of detection sensors;
  - recording the monitored machining;
  - bookmarking the recording at specific times based on the program data and CNC machine data output;
  - sending the recording to the data collection platform, wherein the recording is stored in a database that is organized by time-based bookmarks;
  - wherein the data collection platform further comprises a parameter and output association, and wherein the parameter and output association includes a link between a program source control and output artifacts.

2. The system of claim 1, wherein the program source control comprises program data, revisions to the program data, parameterized code data, and revisions to the parameterized code.

3. The system of claim 2, wherein the output artifacts comprise part measurements, CNC machine data, and machining outputs.

4. The system of claim 1, wherein the machine data is filtered to determine data of interest, and wherein the data of interest is saved to a user cache.

5. A method for utilizing the system according to claim 1 comprising:
- remotely providing and updating instructions for the CNC machine, the instructions being taken from the set of instructions;
- storing and organizing the instructions and any changes;
- monitoring operation of the CNC machine; and
- linking the instructions taken from the set of instructions, the updated instructions, the output artifacts, and the parts measurements of the output artifacts.

6. A method for data collection and organization from computer numerical control (CNC) machine tools comprising:
- providing a CNC machine configured to machine a plurality of parts;
- receiving program data through a data collection platform, wherein the data collection platform is in communication with the CNC machine and wherein the program data includes a set of instructions;
  - machining, based on the set of instructions, the plurality of parts;
  - monitoring the machining the plurality of parts with a plurality of detection sensors;

recording the monitored machining;

bookmarking the recording at specific times based on the program data and CNC machine data output;

sending the recording to the data collection platform, wherein the recording is stored in a database that is organized by time-based bookmarks; and wherein the data collection platform further comprises a parameter and output association, and wherein the parameter and output association includes a link between a program source control and output artifacts.

7. The method of claim 6, wherein the program source control comprises program data, revisions to the program data, parameterized code data, and revisions to the parameterized code, in particular output artifacts comprise part measurements, CNC machine data, and machining outputs.

8. The method of claim 6, wherein the machine data is filtered to determine data of interest, and wherein the data of interest is saved to a user cache.

* * * * *